United States Patent [19]
Suzuki et al.

[11] Patent Number: 5,640,194
[45] Date of Patent: Jun. 17, 1997

[54] METHOD OF MULTIPLEXED DATA READING AND VISUAL SEARCH SUITABLE FOR VIDEO-ON-DEMAND SYSTEM

[75] Inventors: Hideharu Suzuki; Kazutoshi Nishimura, both of Tokyo; Hideki Sakamoto, Saitamaken; Tatsuo Mori, Chibaken, all of Japan

[73] Assignee: Nippon Telegraph and Telephone Corporation, Tokyo, Japan

[21] Appl. No.: 357,032

[22] Filed: Dec. 16, 1994

[30]  Foreign Application Priority Data

Dec. 17, 1993 [JP] Japan ................... 5-344049
Jun. 13, 1994 [JP] Japan ................... 6-166420

[51] Int. Cl.$^6$ .............. H04N 7/14; H04H 1/00; H01J 1/00
[52] U.S. Cl. .............. 348/7; 348/12; 348/13; 455/4.2; 455/5.1; 395/441; 395/200.08; 395/200.09
[58] Field of Search ............ 348/7, 12, 13; 455/5.1, 4.2, 4.1; 395/200.01, 200.8, 200.9, 427, 438, 439, 441; H04N 7/14, 7/10

[56]  References Cited

U.S. PATENT DOCUMENTS

| | | |
|---|---|---|
| 5,481,542 | 1/1996 | Logston et al. .................. 370/94.2 |
| 5,528,282 | 6/1996 | Voeten et al. ..................... 348/7 |
| 5,539,448 | 7/1996 | Verhille et al. ................... 348/6 |
| 5,553,005 | 9/1996 | Voeten et al. ................... 364/514 R |
| 5,583,561 | 12/1996 | Baker et al. ..................... 348/7 |
| 5,583,868 | 12/1996 | Rashid et al. .................... 370/394 |
| 5,586,264 | 12/1996 | Belknap et al. .................. 395/200.08 |

*Primary Examiner*—Michael H. Lee
*Assistant Examiner*—John W. Miller
*Attorney, Agent, or Firm*—Banner & Witcoff, Ltd.

[57]  ABSTRACT

A method of multiplexed data reading and visual search, in which each video program is divided into a plurality of video data groups which are stored in a prescribed order among the memory devices, and m memory control units are connected with m×n input/output channels selectively and sequentially in units of time-slots such that each memory control unit is connected with each of input/output channel at least once within a prescribed period. Then, the reading operations of the video data groups stored in the memory devices are carried out by making accesses from m memory control units in parallel at each time-slot. Also, the visual search operations are carried out by abandoning a time-slot allocated to one input/output channel in a next small period when a request for changing a current playback mode to a new playback mode is received from a terminal in a current small period, allocating a new time-slot at which a next video data group to be accessed in the next small period according to the new playback mode is accessible to that input/output channel in the next small period, and reading and buffering the next video data group by using the new time-slot in the next small period.

16 Claims, 12 Drawing Sheets

METHOD OF MULTIPLEXED DATA READING AND VISUAL SEARCH SUITABLE FOR VIDEO-ON-DEMAND SYSTEM

BACKGROUND OF THE INVENTION

1. Field of the Invention

The present invention relates to a method of multiplexed reading and visual search of large sized files such as those of the video data, and more particularly, to a method of multiplexed reading and visual search of data capable of improving the multiplexed operation performance while enabling visual search operations in the video-on-demand system at a time of executing a plurality of reading requests with respect to a memory device storing a multiplicity of video data accompanied by audio data.

2. Description of the Background Art

In the conventional video-on-demand system in which a center device and a number of terminals are connected, when a terminal requests a reception of a desired video program to the center device, the center device reads out data of the requested video program from a memory device and transmits the read out video data to the requesting terminal.

In such a case, there is a possibility for the other request from the other terminal to arrive at the center device while reading out the data of the requested video program from the memory device in response to the request from one terminal, and in order to deal with such a situation, it is necessary to provide a multiplexed reading operation with respect to the memory device.

To this end, there has been a proposition of the multiplexed reading device as disclosed in Japanese Patent Application Laid Open No. 4-269087 (1992) which is capable of executing the reading operation with respect to the memory device (magnetic disk device) at a higher rate than the bit rate of the video program in time sharing basis.

Namely, in this conventional multiplexed reading device, the compression encoded video data are stored on disks, and the utilization time-slots $TS_1$ to $TS_n$ of the disk device are assigned sequentially in this same order at every one of the first and subsequent operation periods.

On the disks to be reproduced by the disk device, each video data is recorded by being divided into a number of pieces, such that when these divided pieces are sequentially read out by making accesses at the first time-slot $TS_1$ of the first period, the first time-slot $TS_1$ of the second period, and so on up to the first time-slot $TS_1$ of the n-th period, and then joined together, one continuous video data can be obtained. Similarly, the access and reading of the video data are carried out such that when the data read out at the same i-th time-slots $TS_1$ of the different periods are joined in a correct order, one continuous video data can be obtained.

The data reproduced from the disks in this manner are then written into a buffer memory for the purpose of expanding the compression encoded video data by an expansion device to recover the normal video data, and the recovered normal video data are transmitted to the terminal to display the visual images according to the normal video data at a display monitor of the terminal.

Now, in order to increase the number of multiplexed reading operations at the center device as a whole, it is possible to consider a system configuration in which a plurality of multiplexed reading devices as described above are provided in parallel.

FIG. 1 shows an exemplary configuration of such a system in which a plurality of multiplexed reading devices are provided in parallel. This configuration of FIG. 1 includes a number of terminals $T_1$ to $T_{40+a}$, connected to a network 2, where each terminal includes a communication control unit, a decoder, an AV device, and an input device (not shown) such that the request of the user specified at the input device are transmitted to the center device by the communication control unit, while the video data received from the center device are decoded (expanded) by the decoder and displayed by the AV device.

The network 2 is formed by the ISDN (Integrated Services Digital Network) for example, and equipped with a number of input/output channels $C_1$ to $C_{40}$, where each input/output channel is in a form of a board mounting a buffer memory and a communication processing device (not shown).

The configuration of FIG. 1 further includes four memory devices $M_{01}$ to $M_{31}$ such as the magnetic disk devices, which are connected with the input/output channels $C_1$ to $C_{40}$ through memory control units $MC_{01}$ to $MC_{31}$ and switching units $SW_0$ to $SW_3$. Here, four memory control units $MC_{01}$ to $MC_{31}$ are provided within the center device, where each memory control unit is in a form of a magnetic disk control board. In a case of the SCSI (Small Computer System Interface), one memory control unit can be connected with up to seven memory devices in series to expand the memory capacity.

The switching units $SW_0$ to $SW_3$ are formed by the VME (Versa Module Europe) bus which constitutes the transmission paths between the memory control units $MC_{01}$ to $MC_{31}$ and the input/output channels $C_1$ to $C_{40}$. In this example, a number of time-slots in each period is set to 10, so that each switching unit connects ten of the input/output channels to one memory control unit and each memory control unit has a capacity to handle ten multiplexed reading operations within each period.

The configuration of FIG. 1 also includes a multiplexed reading control unit 31 formed by a communication control unit and a micro-processor (not shown), which admits the requests from the terminals $T_1$ to $T_{40+a}$, and issues commands for the multiplexed reading operations to the memory control units $MC_{01}$ to $MC_{31}$ and the switching units $SW_0$ to $SW_3$.

In this configuration of FIG. 1, when a user at one of the terminals $T_1$ to $T_{40+a}$ requests a desired video program, the request is transmitted to the multiplexed reading control unit 31 within the center device through the network 2.

In response, the multiplexed reading control unit 31 searches out an appropriate one of the memory devices $M_1$ to $M_{31}$ which stores the data of the requested video program, and commands one of the memory control units $MC_{01}$ to $MC_{31}$ connected with the searched out appropriate memory device to execute the reading of the data of the requested video program.

Here, the multiplexed reading control unit 31 allocates the input/output channels $C_1$ to $C_{10}$ as the output destinations of up to ten video program requests with respect to the memory control unit $MC_{01}$ in an order of arrivals, and returns a center busy signal to all the terminals requesting the requests in excess of ten. The data of ten video programs are read out from the memory device $M_{01}$ in units of segments at ten time-slots of each period, respectively, through the memory control unit $MC_{01}$ under the control of the multiplexed reading control unit 31, and transmitted to the respective allocated input/output channels $C_1$ to $C_{01}$ through the switching unit $SW_0$. The other memory control units $MC_{11}$, $MC_{21}$, and $MC_{31}$ are similarly connected with the other input/output channels $C_{11}$ to $C_{20}$, $C_{21}$ to $C_{30}$, and $C_{31}$ to $C_{40}$ through the other switching units $SW_1$, $SW_2$, and $SW_3$, respectively.

Thus, in this case, the input/output channels $C_1$ to $C_{40}$ and the memory control units $MC_{01}$ to $MC_{31}$ are connected in correspondence relationship as summarized in the table shown in FIG. 2. Namely, the memory control unit $MC_{01}$ is sequentially connected with the input/output channel $C_1$ at the first time-slot $TS_1$ of each period, the input/output channel $C_2$ at the second time-slot $TS_2$ of each period, and so on. The connection and reading operations by the input/output channels $C_1$ to $C_{40}$ and the memory control unit $MC_{01}$ to $MC_{31}$ according to this correspondence relationship of FIG. 2 is repeated in each period. Each of the input/output channels $C_1$ to $C_{40}$ transmits the segment data of the requested video programs received from the connected memory control units $MC_{01}$ to $MC_{31}$ to the respective requesting terminals through the network 2. Then, at each terminal, the sequentially transmitted series of segment data for the requested video program are decoded and displayed.

In this conventional multiplexed reading device of FIG. 1, four of ten-fold multiplexed sub-systems are provided in parallel to improve the multiplexed reading capacity of the center device to up to 10×4=40, but this type of the conventional multiplexed reading device has a problem in that the requests in excess of ten with respect to each memory device cannot be admitted even when a large number of requests from the terminals are concentrated onto a particular video program stored in a particular memory device, no matter how many sub-systems are provided in parallel.

In other words, in this type of the conventional multiplexed reading device, when m sets of n-fold multiplexed sub-systems are provided in parallel, regardless of how large the number m of the sub-systems provided in parallel may be, the maximum number of requests that can be admitted simultaneously with respect to each memory device is limited to the number n of the multiplexed reading operations supported by each sub-system, so that the service of a particular video program can be provided with respect to only up to n terminals simultaneously even when more than n terminals requested this particular video program.

SUMMARY OF THE INVENTION

It is therefore an object of the present invention to provide a method of multiplexed data reading and visual search capable of admitting more than n requests simultaneously in a configuration in which m sets of n-fold multiplexed sub-systems are provided in parallel while enabling the visual search operations.

According to one aspect of the present invention there is provided a method of multiplexed data reading and visual search with respect to a plurality of memory devices through m memory control means connected to the memory devices and m×n input/output channels selectively connected to said m memory control devices via switching means, where m and n are integers greater than one, the method comprising the steps of: (a) dividing each video program into a plurality of video data groups and storing the video data groups of each video program in a prescribed order among the memory devices; (b) connecting said m memory control means with said m×n input/output channels selectively and sequentially by the switching means in units of time-slots such that each of said m memory control means is connected with each of said m×n input/output channels at least once within a prescribed large period, said prescribed large period being defined by a plurality of time-slots divided into m small periods; (c) carrying out the reading operations of the video data groups stored by the step (a) in the memory devices by making accesses from said m memory control means in parallel at each time-slot such that each video data group read by each of said m memory control means from one of the memory devices connected thereto at each time-slot is transmitted to one of said m×n input/output channels connected by the step (b) thereto at each time-slot; and (d) carrying out the visual search operations with respect to the video data groups stored by the step (a) in the memory devices by abandoning a time-slot allocated to one input/output channel in a next small period when a request for changing a current playback mode to a new playback mode is received from a terminal connected with said one input/output channel in a current small period, allocating a new time-slot at which a next video data group to be accessed in the next small period according to the new playback mode is accessible to said one input/output channel in the next small period, and reading and buffering the next video data group by using the new time-slot in the next small period.

Other features and advantages of the present invention will become apparent from the following description taken in conjunction with the accompanying drawings.

DETAILED DESCRIPTION OF THE PREFERRED EMBODIMENTS

Now, one embodiment of the method of multiplexed data reading and visual search according to the present invention will be described in detail.

Figure 1:
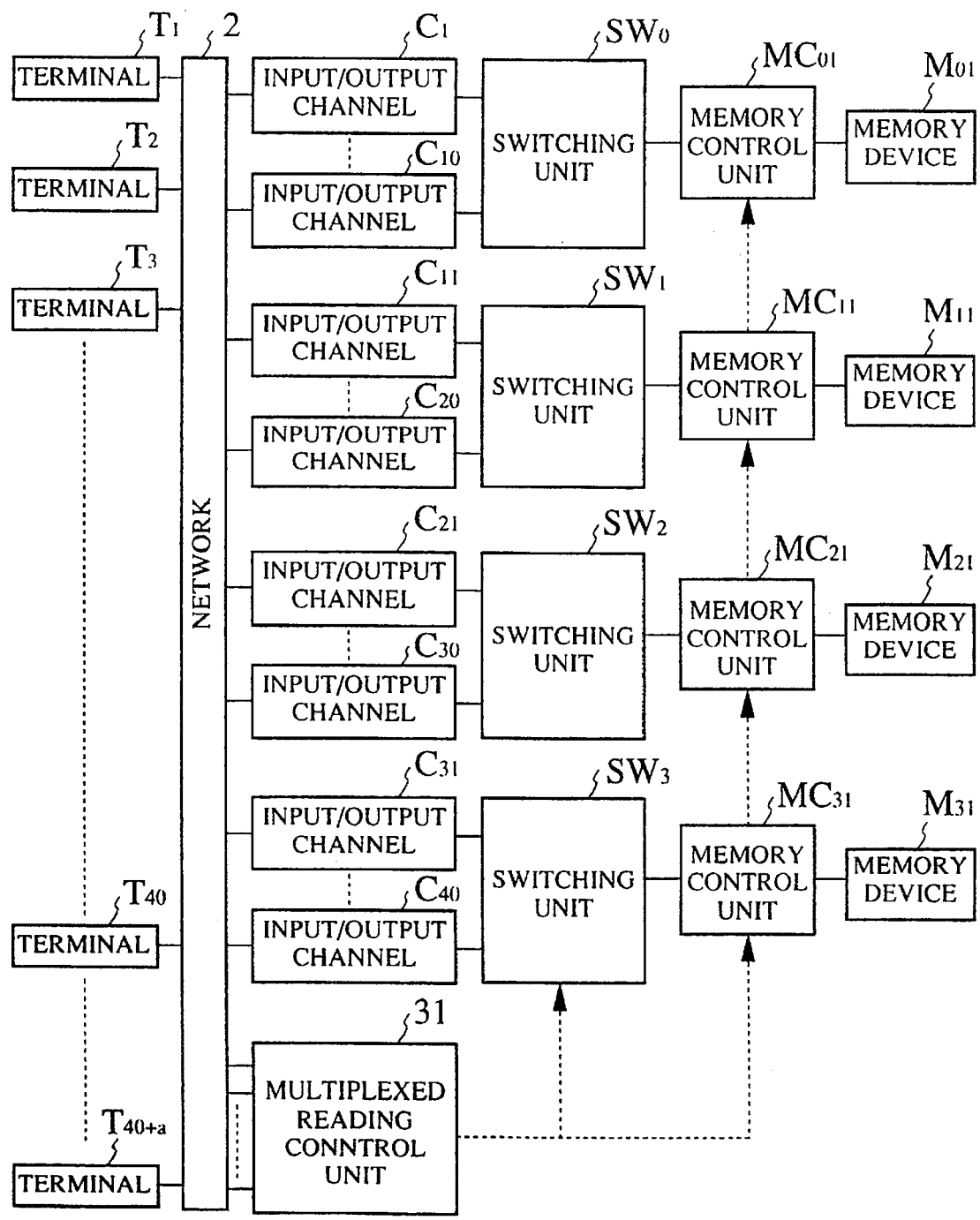
FIG. 1 is a schematic block diagram of a video-on-demand system incorporating a conventional multiplexed data reading device.
Figure 2:
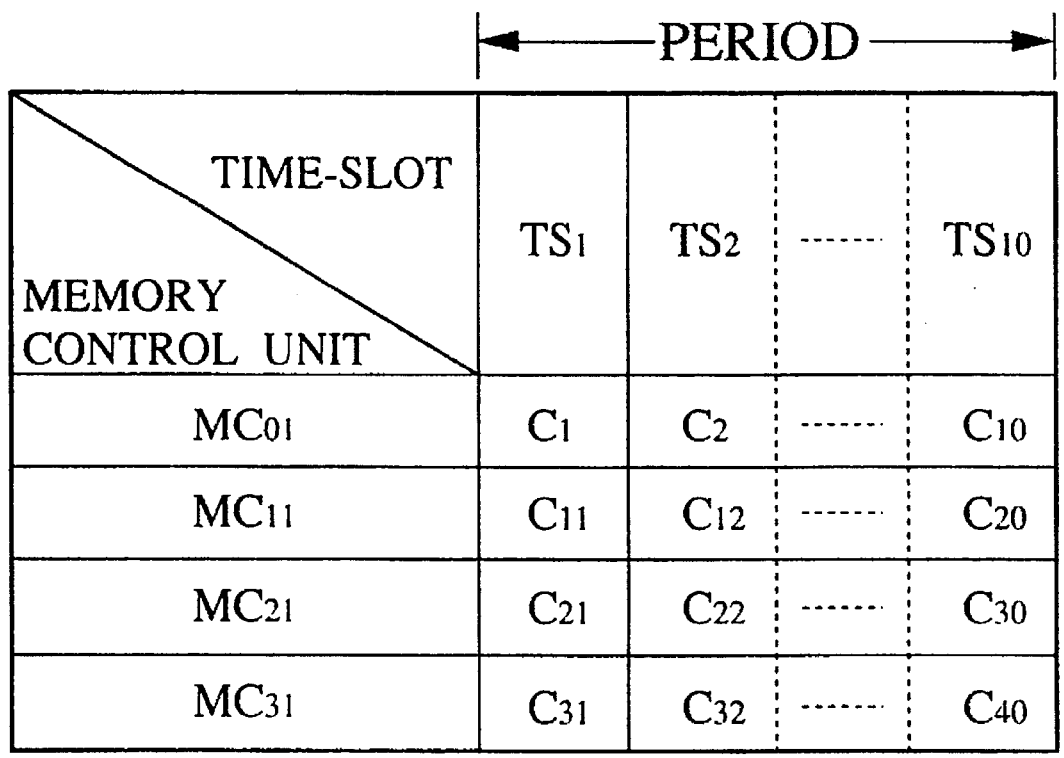
FIG. 2 is a table summarizing connection relationships between memory control units and input/output channels in the system of FIG. 1
Figure 3:
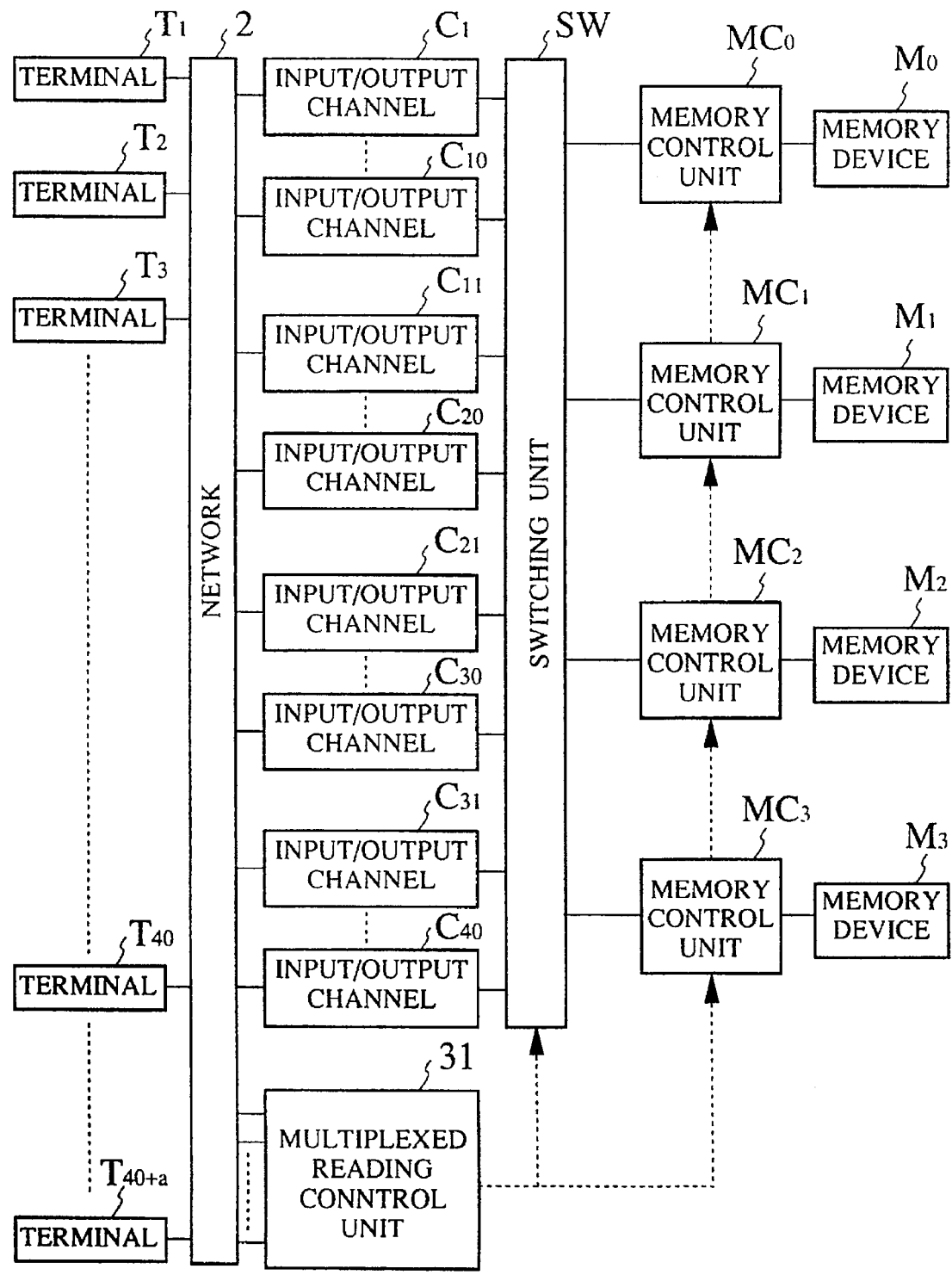
FIG. 3 is a schematic block diagram of a video-on-demand system suitable for carrying out the method of multiplexed data reading and visual search according to the present invention.

In this embodiment, the video-on-demand system has a schematic configuration as Shown in FIG. 3, which comprises terminals $T_1$ to $T_{40+a}$, connected with a center device through a network 2, and a center device including a multiplexed reading control unit 3 and input/output channels $C_1$ to $C_{40}$ connected to the network 2, and four memory devices $M_0$ to $M_3$ connected with the input/output channels $C_1$ to $C_{40}$ through a switching unit SW and four memory control units $MC_0$ to $MC_3$ which are controlled by the multiplexed reading control unit 3. Here, "a" of the terminal $T_{40+a}$, is an arbitrary positive integer, so that there are more than 40 terminals in this embodiment.

Each terminal includes a communication control unit, a decoder, an AV device, and an input device (not shown) such that the request of the user specified at the input device are transmitted to the center device by the communication control unit, while the video data received from the center device are decoded (expanded) by the decoder and displayed by the AV device.

The network 2 is formed by the ISDN (Integrated Services Digital Network) for example, while each input/output channel is in a form of a board mounting a buffer memory and a communication processing device (not shown).

Each one of the memory devices $M_0$ to $M_3$ is the magnetic disk device, while each one of the memory control units $MC_0$ to $MC_3$ is in a form of a magnetic disk control board. In a case of the SCSI (Small Computer System Interface), one memory control unit can be connected with up to seven memory devices in series to expand the memory capacity.

The switching unit SW is formed by the VME (Versa Module Europe) bus which constitutes the transmission paths between the memory control units $MC_0$ to $MC_3$ and the input/output channels $C_1$ to $C_{40}$, and the multiplexed reading control unit 3 is formed by a communication control unit and a micro-processor (not shown), which admits the requests from the terminals $T_1$ to $T_{40+a}$, and issues commands for the multiplexed reading operations to the memory control units $MC_0$ to $MC_3$ and the switching unit SW.

In this configuration of FIG. 3, the data of each video program are encoded (compressed) at the bit rate of R bit/sec, and divided into a number of segments in units of S bits starting from the top of the encoded data. Then, the divided segments are cyclically stored in the memory devices $M_0$, $M_1$, $M_2$, and $M_3$ starting from the top segment, in an order to be described below. When a user at one of the terminals $T_1$ to $T_{40+a}$ requests a desired video program, the request is transmitted to the multiplexed reading control unit 3 within the center device through the network 2.

Figure 4:
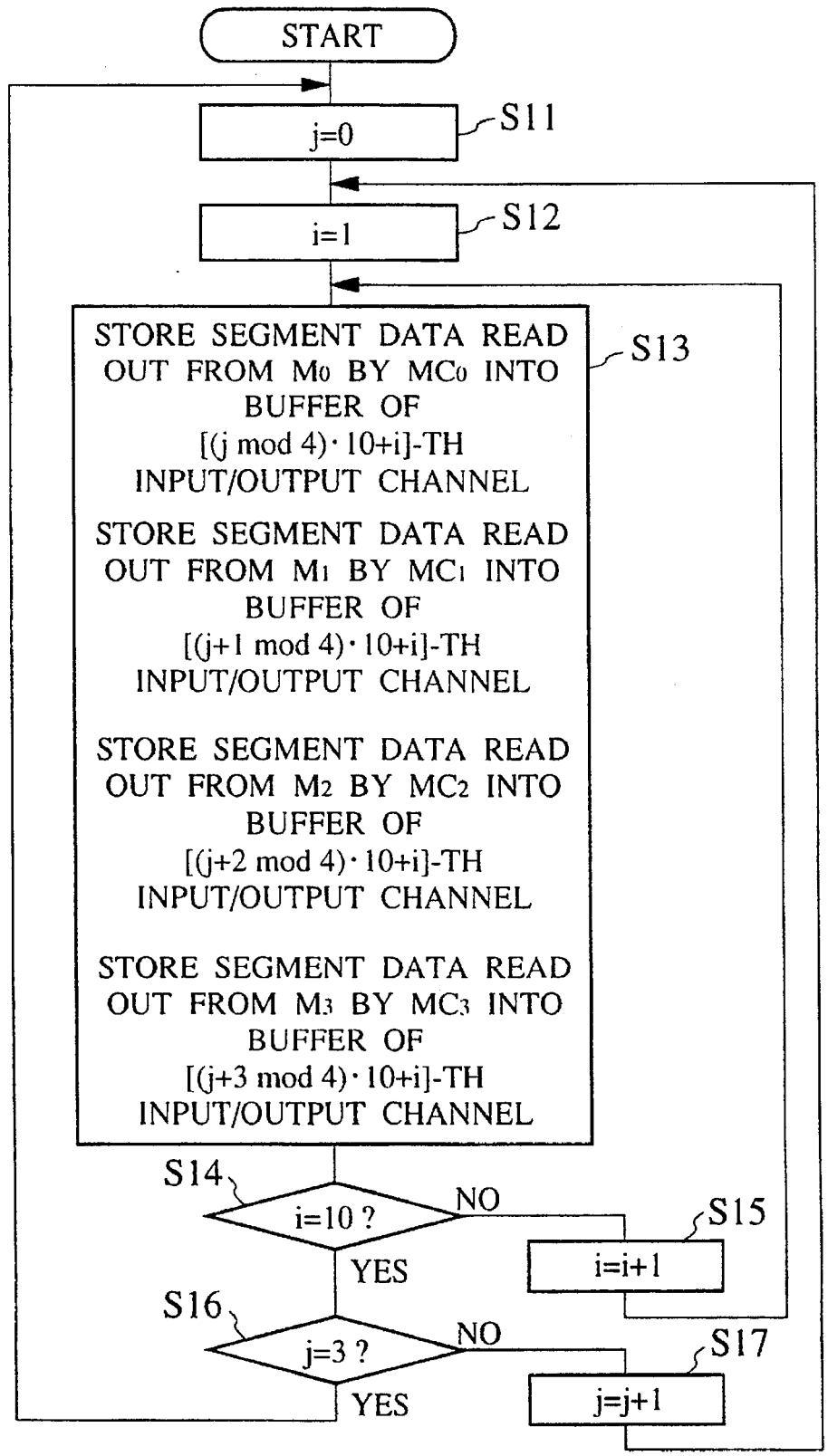
FIG. 4 is a flow chart for an operation according to one embodiment of the method of multiplexed data reading and visual search according to the present invention.

In further detail, the method of multiplexed data reading in this embodiment proceeds according to the flow chart of FIG. 4 as follows.

First, the small period variable j is initialized to "0" (step S11), and the time-slot variable i is initialized to "1" (steps S12).

Then, the segment data read out from the memory device $M_0$ by the memory control unit $MC_0$ Is stored into the buffer memory of the [(j mod 4)·10+i]-th input/output channel, the segment data read out from the memory device $M_1$ by the memory control unit $MC_1$ is stored into the buffer memory of the [(j+1 mod 4)·10+i]-th input/output channel, the segment data read out from the memory device $M_2$ by the memory control unit $MC_2$ is stored into the buffer memory of the [(j+2 mod 4)·10+i]-th input/output channel, and the segment data read out from the memory device $M_3$ by the memory control unit $MC_3$ is stored into the buffer memory of the [(j+3 mod 4)·10+i]-th input/output channel (step S13). Here, (j mod 4) denotes the residue of j divided by 4, and so on.

After four segment data are stored in the buffer memories of four different input/output channels, the time-slot variable i is increased by one unless the time-slot variable i is equal to 10 (steps S14 and S15) and the step S13 is repeated for the next time-slot. In this embodiment, the operations to store the segment data into the buffer memories are synchronized at each time-slot, When the time-slot variable i is equal 10 at the step S14, the small period variable j is increased by one unless the small period variable j is equal to 3 (steps S16 and S17) and the steps S12 to S15 are repeated for the next small period. When the small period variable j is equal to at the step S16, the operation for one large period has been completed, and the operation returns to the step S11 for the next large period.

As described, according to this embodiment, it is possible to read out 40 different video data and store them in different input/output channels at each small period, so that it becomes possible to admit 40 different video program requests from 40 different terminals simultaneously in the configuration in which 4 sets of 10-fold multiplexed subsystems are provided in parallel.

Figure 5:
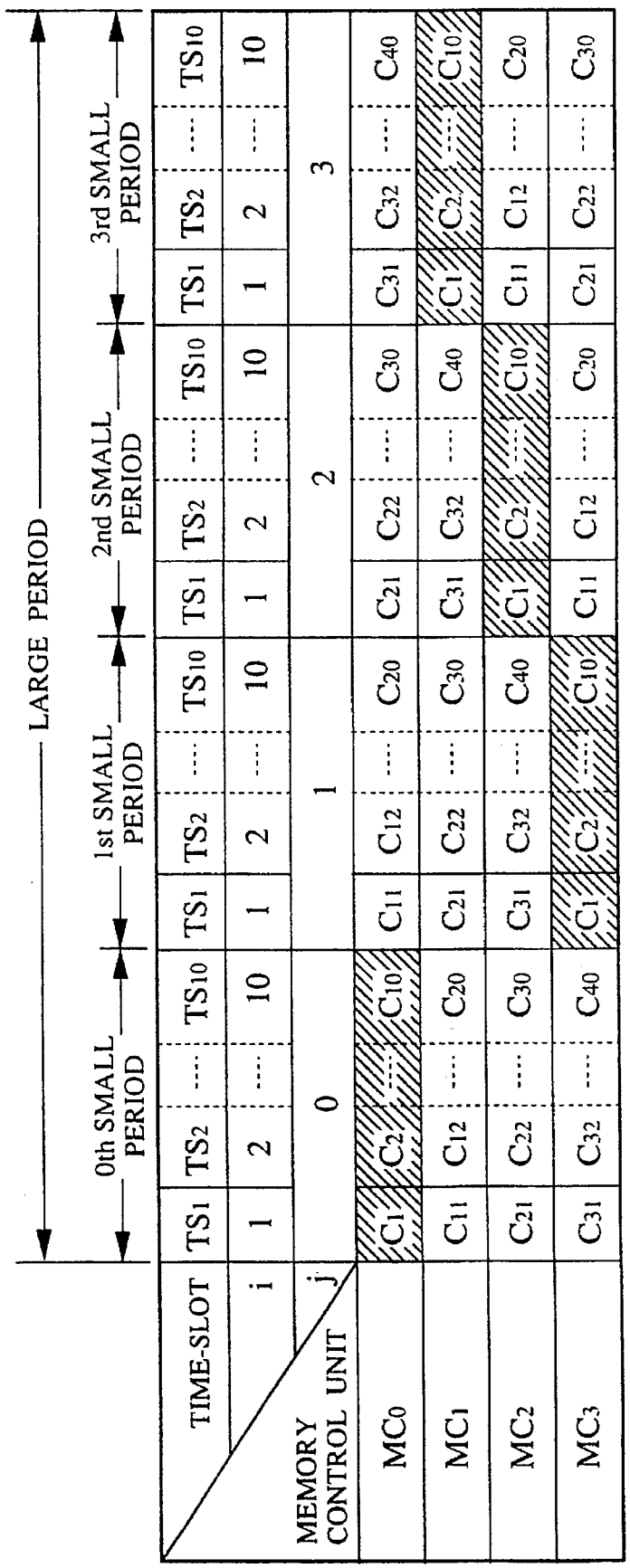
FIG. 5 is a timing chart showing connection relationships between memory control units and input/output channels according to one embodiment of the method of multiplexed data reading and visual search according to the present invention.

Thus, in this embodiment, in response to the received request, the multiplexed reading control unit 3 controls the connection and reading operations by the input/output channels $C_1$ to $C_{40}$ and the memory control units $MC_0$ to $MC_3$ according to the timing chart of FIG. 5.

In FIG. 5, one small period is formed by ten time-slots $TS_1$ to $TS_{10}$, while one large period is formed by as many small periods as a number of the memory control units provided. In this example, as there are four memory control units $MC_0$ to $MC_3$, so that one large period is formed by four (0th, 1st, 2nd, and 3rd) small periods. Within each large period, the operations of small periods are carried out in an order of these small periods sequentially such that when the operation of the 0th period is completed, the operation of the 1st period is started, and so on. The operation of the large period is repeated as many times as necessary. In this example, each time-slot takes 0.1 sec. for example, such that each small period takes 1 sec. and each large period takes 4 sec.

According to the timing chart of FIG. 5, at the 0th small period, the memory control unit $MC_0$ is sequentially connected with the input/output channel $C_1$ at the first time-slot $TS_1$, the input/output channel $C_2$ at the second time-slot $TS_2$, and so on, up to the input/output channel $C_{10}$ at the tenth time-slot $TS_{10}$. Meanwhile, at this 0th small period, the memory control unit $MC_1$ is sequentially connected with the input/output channels $C_{11}$, $C_{12}$, ..., $C_{20}$ at the time-slots $TS_1$, $TS_2$, ..., $TS_{10}$, respectively, the memory control unit $MC_2$ is sequentially connected with the input/output channels $C_{21}$, $C_{22}$, ..., $C_{30}$ at the time-slots $TS_1$, $TS_2$, ..., $TS_{10}$, respectively, and the memory control unit $MC_3$ is sequentially connected with the input/output channels $C_{31}$, $C_{32}$, ..., $C_{40}$ at the time-slots $TS_1$, $TS_2$, ..., $TS_{10}$, respectively.

On the other hand, at the 1st small period, the memory control unit $MC_3$ is sequentially connected with the input/output channels $C_1, C_2, \ldots, C_{10}$ at the time-slots $TS_1, TS_2, \ldots, TS_{10}$, respectively, so that the connection relationship of this memory control unit $MC_3$ at the 1st small period is identical to that of the memory control unit $MC_0$ at the 0th small period. Similarly, the connection relationship of the memory control unit $MC_0$ at the 1st small period is identical to that of the memory control unit $MC_1$ at the 0th small period, the connection relationship of the memory control unit $MC_2$ at the 1st small period is identical to that of the memory control unit $MC_2$ at the 0th small period, and the connection relationship of the memory control unit $MC_2$ at the 1st small period is identical to that of the memory control unit $MC_3$ at the 0th small period.

In other words, the connection relationships with respect to the input/output channels $C_1$ to $C_{40}$ are cyclically rotated among the memory control units $MC_0$, $MC_1$, $MC_2$, and $MC_3$, such that the connection relationships at the 1st small period can be obtained by cyclically rotating the connection relationships at the 0th small period by a unit of one memory control unit, the connection relationships at the 2nd small period can be obtained by cyclically rotating the connection relationships at the 0th small period by a unit of two memory control unit, and the connection relationships at the 3rd small period can be obtained by cyclically rotating the connection relationships at the 0th small period by a unit of three memory control unit. In order to make it easier to comprehend such cyclic rotations of the connection relationships, the entries for the connections with the input/output channels $C_1$ to $C_{10}$ at the time-slots $TS_1$ to $TS_{10}$ in each small period are shaded.

Thus, the input/output channel $C_1$ is sequentially connected with the memory control units $MC_0$, $MC_3$, $MC_2$, and $MC_1$ at the first time-slot $TS_1$ of the 0th, 1st, 2nd, and 3rd small periods, respectively, to store the segment data read out from the memory devices $M_0$, $M_3$, $M_2$, and $M_1$, while the input/output channel $C_2$ is sequentially connected with the memory control units $MC_0$, $MC_3$, $MC_2$, and $MC_1$ at the second time-slot $TS_2$ of the 0th, 1st, 2nd, and 3rd small periods, respectively, to store the segment data read out from the memory devices $M_0$, $M_3$, $M_2$, and $M_1$, and so on. Consequently, the input/output channel $C_{30}$ is sequentially connected with the memory control units $MC_2$, $MC_1$, $MC_0$, and $MC_3$ at the tenth time-slot $TS_{10}$ of the 0th, 1st, 2nd, and 3rd small periods, respectively, to store the segment data read out from the memory devices $M_2$, $M_1$, $M_0$, and $M_3$, for example.

Here, each of the input/output channel can be equipped with double buffers, such that for example, when the input/output channel $C_1$ is connected with the memory control unit $MC_0$ to receive one segment data from the memory device $M_0$ at the first time-slot $TS_1$ of the 0th small period, the received segment data is stored in one of the double buffers and this segment data is expanded and displayed at the terminal connected to the input/output channel $C_1$ during a period of time between the second time-slot $TS_2$ of the 0th small period and the first time-slot $TS_1$ of the 1st small period. Then, when the input/output channel $C_1$ is connected with the memory control unit $MC_3$ to receive one segment data from the memory device $M_3$ at the first time-slot $TS_1$ of the 1st small period, the received segment data is stored in another one of the double buffers and this segment data is expanded and displayed at the terminal connected to the input/output channel $C_1$ during a period of time between the second time-slot $TS_2$ of the 1st small period and the first time-slot $TS_1$ of the 2nd small period, and so on. Instead of such double buffers, each of the input/output channel may be equipped with the FIFO (First-In First-Out) buffer, if desired.

In correspondence, the divided segments of the data for each video program are cyclically stored in the memory devices $M_0$, $M_1$, $M_2$, and $M_3$ in such an order that the continuous data can be obtained by joining the segments data read out from the memory devices $M_0$, $M_3$, $M_2$, and $M_1$ at the first time-slot $TS_1$ of the 0th, 1st, 2nd, and 3rd small periods, respectively, and so on.

In this manner, at each small period, 40 different video data corresponding to 40 different video program requests from 40 different terminals can be read out in units of segments from the memory devices $M_0$ to $M_3$ through the memory control units $MC_0$ to $MC_3$ under the control of the multiplexed reading control unit 3, and transferred to the respective allocated input/output channels $C_1$ to $C_{40}$ through the switching unit SW under the control of the multiplexed reading control unit 3, and then transmitted to the respective requested terminals among the terminals $T_1$ to $T_{40+a}$, through the network 2. At each of the terminals $T_1$ to $T_{40+a}$, the series of segment data transmitted from the network 2 are decoded and displayed.

Thus, in this embodiment, the multiplexed reading operation capacity of the center device is 4×10=40, so that the multiplexed reading control unit 3 allocates the input/output channels $C_1$ to $C_{40}$ as the output destinations of up to 40 video program requests with respect to each memory control unit in an order of arrivals, and returns a center busy signal to all the terminals requesting the requests in excess of 40.

As described, according to this embodiment, the input/output channels $C_1$ to $C_{40}$ and the memory control units $MC_0$ to $MC_3$ are connected in correspondence relationship as summarized in the table shown in FIG. 5. Namely, the memory control unit $MC_0$ is sequentially connected with the input/output channel $C_1$ at the first time-slot $TS_1$ of each period, the input/output channel $C_2$ at the second time-slot $TS_2$ of each period, and so on. The connection and reading operations by the input/output channels $C_1$ to $C_{40}$ and the memory control unit $MC_0$ to $MC_3$ according to this correspondence relationship of FIG. 5 is repeated in each period. Each of the input/output channels $C_1$ to $C_{40}$ transmits the segment data of the requested video programs received from the connected memory control units $MC_0$ to $MC_3$ to the respective requesting terminals through the network 2. Then, at each terminal, the sequentially transmitted series of segment data for the requested video program are decoded and displayed.

Figure 6:
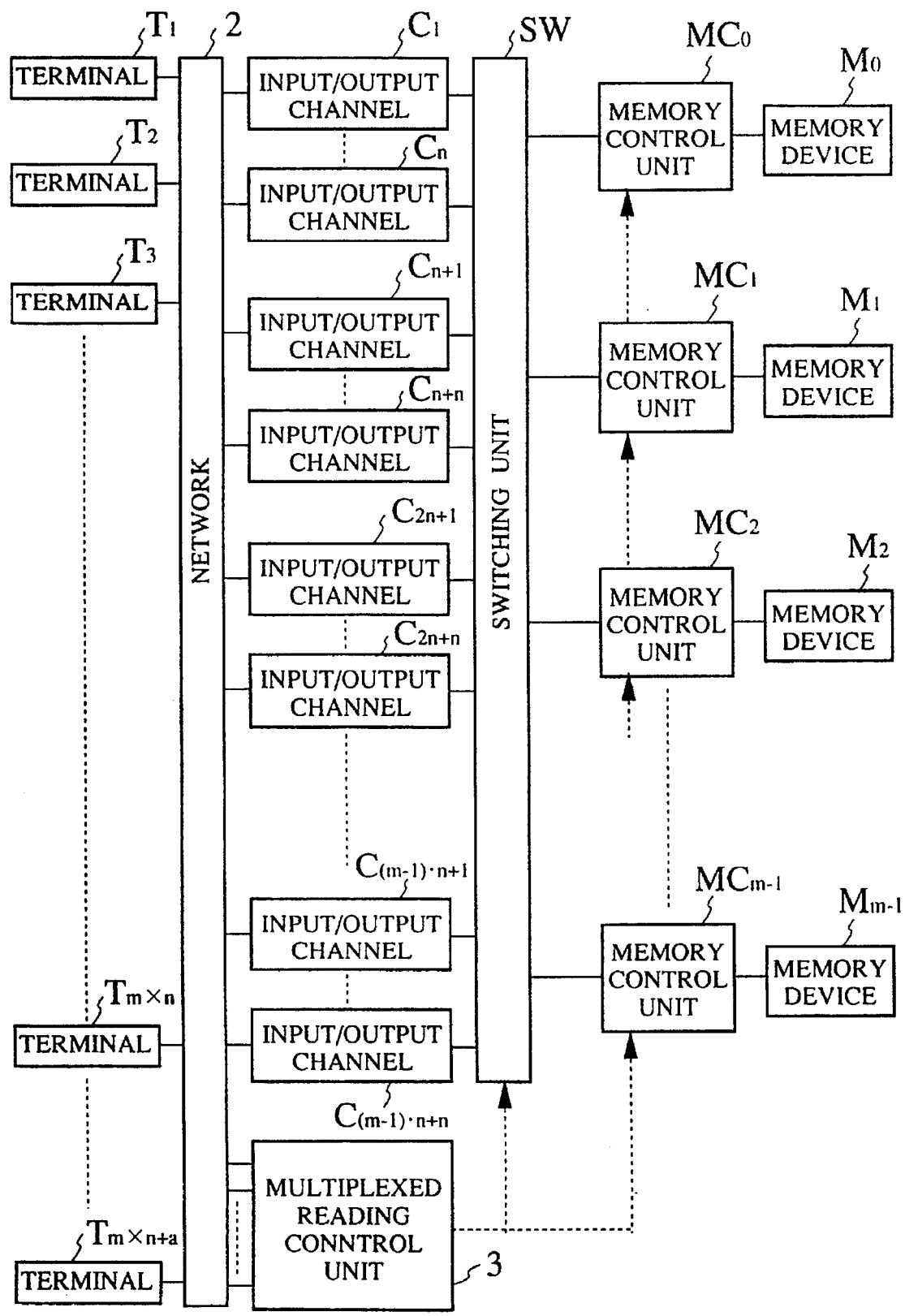
FIG. 6 is a schematic block diagram of a video-on-demand system generalizing the configuration of FIG. 3.

It is to be noted here that the above described embodiment can be generalized as follows Namely, in this generalized ease, the video-on-demand system has a schematic configuration as shown in FIG. 6 instead of the configuration of FIG. 3, which comprises terminals $T_1$ to $T_{m \cdot n+a}$ connected with a center device through a network 2, and a center device including a multiplexed reading control unit 3 and input/output channels $C_1$ to $C_{(m-1) \cdot n+n}$ connected to the network 2, and m memory devices $M_0$ to $M_{m-1}$ connected with the input/output channels $C_1$ to $C_{(m-1) \cdot n+n}$ through a switching unit SW and m memory control units $MC_0$ to $MC_{m-1}$ which are controlled by the multiplexed reading control unit 3, where m is an integer greater than one.

Here, in a case the time required for the reading with respect to the memory devices $M_0$ to $M_{m-1}$ to be ready since the commands are given from the multiplexed reading control unit 3 to the memory control units $MC_0$ to $MC_{m-1}$ is A sec. and the reading speed with respect to the memory devices $M_0$ to $M_{m-1}$ is T bit/sec, a number n can be any integer not greater than a value obtained by dividing the decoding and display time S/R for each segment data by the reading operation time A+S/T.

Figure 7:
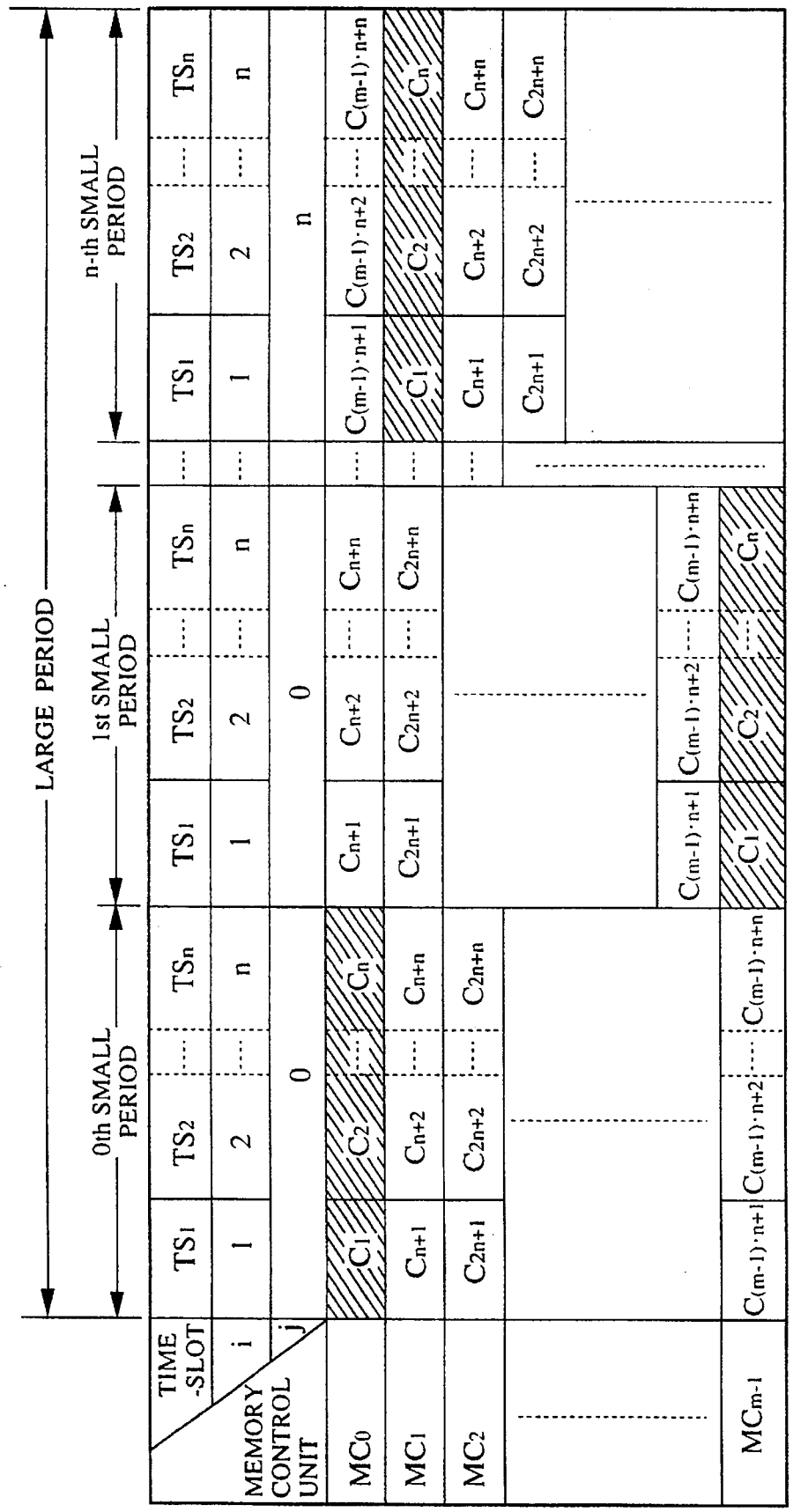
FIG. 7 is a timing chart showing the connection relationships between memory control units and input/output channels generalizing those shown in FIG. 4.

Also, in this generalized case, the multiplexed reading control unit 3 controls the connection and reading operations by the input/output channels $C_1$ to $C_{(m-1)\cdot n+n}$ and the memory control units $MC_0$ to $MC_{m-1}$ according to the timing chart of FIG. 7 instead of the timing chart of FIG. 5.

Thus, in this generalized case, it is possible to read out m×n different video data and store them in different input/output channels at each small period, so that it becomes possible to admit m×n different video program requests from m×n different terminals simultaneously in the configuration in which m sets of n-fold multiplexed sub-systems are provided in parallel.

It is also possible to synchronize the operations to store the segment data into the buffer memories at any one of each large period (m×n time-slots), each small period (n time-slots), and each time-slot.

It should be understood from the above description that, in the most general manner, the method of multiplexed data reading according to the present invention as described above can be expressed as the method of multiplexed data reading with respect to a plurality of memory devices through m memory control units connected to the memory devices and m×n input/output channels selectively connected to the m memory control devices via switching unit, where m and n are integers greater than one, the method comprising the steps of: dividing each data into a plurality of segment data and storing the segment data of each data in a prescribed order among the memory devices; connecting the m memory control units with the m×n input/output channels selectively and sequentially by the switching unit in units of time-slots such that each of the m memory control units is connected with each of the m×n input/output channels at least once within a prescribed period; and carrying out the reading operations of the segment data stored in the memory devices by making accesses from the m memory control units in parallel at each time-slot such that each segment data read by each of the m memory control units from one of the memory devices connected thereto at each time-slot is transmitted to one of the m×n input/output channels connected thereto at each time-slot.

Next, the method of visual search in this embodiment will be described in detail. Namely, when it is made possible to receive the requests in excess of a multiplexing level of each sub-system (that is, a number n in the above description) even in a case a number of program requests concentrates on a particular program, it is also possible to realize the visual search function such as the pseudo fast forward/reverse mode, the slow forward/reverse mode, and the backward skip search mode.

First, an operation for changing the playback mode in this embodiment will be explained.

In this operation, the playback mode is to be changed among a normal playback mode, a pseudo fast forward/reverse mode, a slow forward/reverse mode, a jump mode, and a backward skip search mode, and this operation equally applies to cases of changing the playback mode from the still forward/reverse display or the pause display to any one of the aforementioned playback modes.

Here, an exemplary case of having a request for changing the playback mode that is issued while executing one of the aforementioned playback modes of the normal playback mode, the pseudo fast forward/reverse mode, the slow forward/reverse mode, the jump mode, and the backward skip search mode will be considered. More specifically, it is supposed that the request for changing the playback mode is issued from the terminal when the P-th video data group read out by a d-th memory control unit (d-th one of the memory control units $MC_0$ to $MC_{m-1}$, where d is an integer for which $0 \leq d \leq m-1$) is displayed on the terminal screen. Here, the video data group is a group of video data that are read out in a single time-slot, and can be a group of the video data for 30 frames for example.

In this case, the video data group of the mode changing target specified from one of the terminals $T_1$ to $T_{m\cdot n+a}$ is stored in one of the memory devices $M_0$ to $M_{m-1}$, so that which memory device is storing the video data group of the specified mode changing target is detected, and the time-slot in the next small period at which the access to the detected memory device can be made is allocated by the multiplexed reading control unit 3, and the data are skipped up to the video data group of the specified mode changing target. At this point, the time-slot occupied until immediately before the request for changing the playback mode is issued is abandoned, and the reading operation is continued according to the new time-slot in the next small period at which the access to the detected memory device can be made, so as to realize the playback mode changing.

Figure 8:
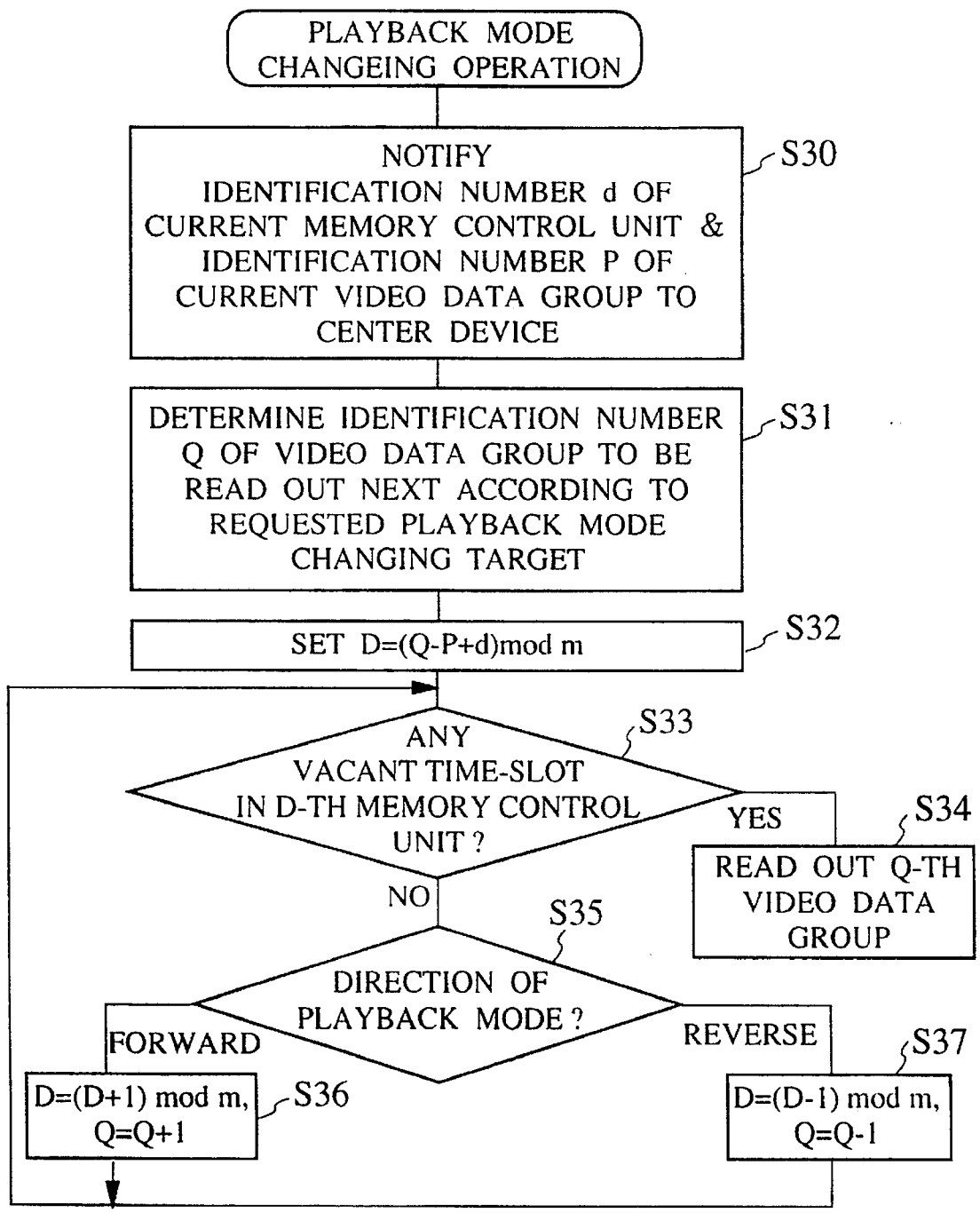
FIG. 8 is a flow chart for an operation to change a playback mode according to one embodiment of the method of multiplexed data reading and visual search according to the present invention.

More specifically, this operation for changing the playback mode proceeds according to the flow chart of FIG. 8 as follows.

First, at a time of issuing the request for changing the playback mode, an identification number d of the memory control unit which read out the video data currently displayed at the terminal and an identification number P of the video data group to which the currently displayed video data belongs are notified together from the terminal to the center device (step S30).

Then, the multiplexed reading control unit 3 determines an identification Q of the video data group to be read out in the next small period (that is, the video data group of the mode changing target specified by the request) according to the position of the requested mode changing target (step S31).

Then, an identification number D of the memory control unit to be connected in the next small period is determined according to the following formula (step S32).

$$D = (Q-P+d) \bmod m$$

Thus, when the request for changing the playback mode is issued, if the P-th video data group read out by the d-th memory control unit is displayed, the Q-th video data group is going to be read out by the D-th memory control unit in the next small period according to the above formula. In other words, this formula indicates the identification number D of the memory control unit to be connected in the next small period is set to be equal to a residue at a time of dividing a value (Q-P+d), in which the identification number d of the currently connected memory control unit is added to a difference between the identification number Q of the video data group of the mode changing target and the identification number P of the current video data group, by a total number m of the memory devices $M_0$ to $M_{m-1}$.

Then, among the time-slots of the D-th memory control unit, the time-slot which is accessible in the next small period (that is, the currently vacant time-slot) is searched, to see if it is possible to make an access to the selected D-th memory control unit in the next small period (step S33).

When the vacant time-slot is found (step S33 YES), the Q-th video data group is read out at that vacant time-slot in the next small period (step S34). Then, after the appropriate buffering, the Q-th video data group is transmitted to the terminal which requested the change of the playback mode, where it is decoded (expanded) and displayed.

Thus, in this embodiment, the video data group of the playback mode changing target can be read out in the small period immediately following the current small period in which the request for changing the playback mode is issued, so that there is no need to await for the read out of the new video data for more than two small periods, and consequently, it is possible to deal with the request for changing the playback mode very quickly.

Note here that, in this case, the reading of the video data is managed in unit of the video data group, so that the starting position of the decoding and displaying is also determined in unit of the video data group, and consequently the decoding and displaying may not necessarily start from the playback mode changing target exactly as requested. For example, when one video data group is formed by three frames, the reading is managed in unit of three frames, so that there are cases in which the decoding and displaying starts from a position which 1s displaced from the requested playback mode changing target by one or two frames. In this embodiment, in order to account for this displacement, the terminal screen is kept in the pause state for as long as a time corresponding to this displacement whenever the request for changing the playback mode to any one of the normal playback mode, the pseudo fact forward/reverse mode, the pause mode, the jump mode, and the backward skip search mode.

It is also to be noted here that the playback mode after the jump mode may be set to the same playback mode as that immediately before the request for jump, or the normal playback mode.

On the other hand, when the vacant time-slot is not found at the step S33 (step S33 NO), that is when all the time-slots of the D-th memory control unit are currently occupied, next, whether the video data group adjacent to the Q-th video data group of the requested mode changing target can be read out in the next small period or not is checked. In other words, whether the memory control unit corresponding to the memory device storing the video data group adjacent to the Q-th video data group of the requested mode changing target (that is, the memory control unit adjacent to the D-th memory control unit) is accessible in the next small period or not is checked by searching the currently vacant time-slot in that memory control unit adjacent to the D-th memory control unit.

More specifically, if the direction of the playback mode after the playback mode changing is forward at the step S35, D is updated to [(D+1) mod m] while Q is updated to [Q+1] (step S36), and the step S33 is repeated to search the time-slot which is accessible in the next small period (that is, the currently vacant time-slot) in the updated D-th memory control unit, to see if it is possible to make an access to the updated D-th memory control unit in the next small period. When the vacant time-slot is found, the (Q+1)-th video data group is read out at that vacant time-slot in the next small period at the step S34. Then, after the appropriate buffering, the (Q+1)-th video data group is transmitted to the terminal which requested the change of the playback mode, where it is decoded (expanded) and displayed.

In this case, the (Q+1)-th video data group which is slightly displaced from the video data group of the requested playback mode changing target is going to be read out and displayed, but this displacement amounts to only as much as several frames, so that it is hardly noticeable in practice.

When the vacant time-slot is not found at the step S33 again even for the updated D-th memory control unit, the above procedure is repeated by updating D and Q by 1 at a time, to see if it is possible to read out the next adjacent video data group in the next small period or not, and if possible, that next adjacent video data group is read out in the next small period, and after the appropriate buffering, transmitted to the terminal which requested the change of the playback mode, and then decoded (expanded) and displayed there.

On the contrary, if the direction of the playback mode after the playback mode changing is reverse at the step S35, D is updated to [(D−1) mod m] while Q is updated to [Q−1] (step S37), and the step S33 is repeated to search the time-slot which is accessible in the next small period (that is, the currently vacant time-slot) in the updated D-th memory control unit, to see if it is possible to make an access to the updated D-th memory control unit in the next small period. When the vacant time-slot is found, the (Q−1)-th video data group is read out at that vacant time-slot in the next small period at the step S34. Then, after the appropriate buffering, the (Q−1)-th video data group is transmitted to the terminal which requested the change of the playback mode, where it is decoded (expanded) and displayed. This is repeated as many times as necessary.

It is to be noted that the updating of Q and D in the above procedure may be made with respect to the video data groups earlier than the Q-th video data group and the video data groups later than the Q-th video data group alternately, regardless of the playback direction, if desired.

As a result of this procedure, when all the time-slots of all the memory control units $MC_0$ to $MC_{m-1}$ are not vacant, the Q-th video data group of the requested playback mode changing target is read out by using the time-slot originally occupied at a time of the request for changing the playback mode in the next small period, and after the appropriate buffering, transmitted to the terminal which requested the change of the playback mode, and then decoded (expanded) and displayed there.

Figure 9:
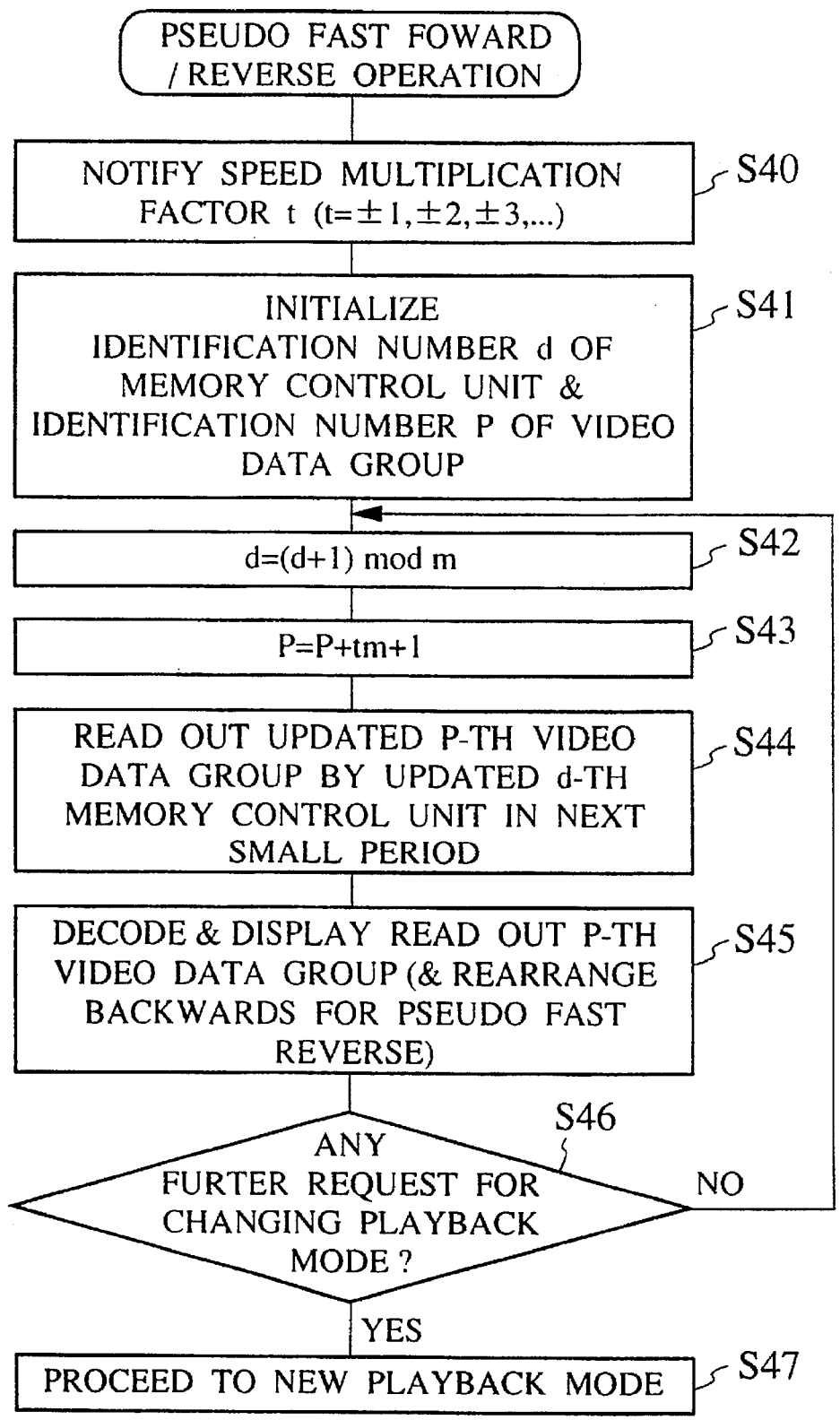
FIG. 9 is a flow chart for an operation in a pseudo fast forward/reverse mode according to one embodiment of the method of multiplexed data reading and visual search according to the present invention.

Next, an operation for the pseudo fast forward/reverse mode in this embodiment proceeds according to the flow chart of FIG. 9 as follows.

When the terminal requests the pseudo fast forward/reverse mode, a speed multiplication factor t for the pseudo fast forward/reverse operation is also notified to the center device (step S40). Here, the speed multiplication factor t can take any one of values such as ±1, ±2, ±3, etc., where a positive integer value indicates the pseudo fast forward operation, whereas a negative integer value indicates the pseudo fast reverse operation.

Then, the identification number d of the memory control unit and the identification number P of the video data group are initialized to the current values (step S41) first, and then updated to new values according to the playback mode changing. Namely, the identification number d of the memory control unit to be accessed in the next small period is updated to [(d+1) mod m] (step S42), while the identification number P of the video data group to be read out next is updated to [P+tm+1] (step S43).

Then, the updated P-th video data group is read out by the updated d-th memory control unit in the next small period (step S44) by skipping the data up to the updated P-th video data group required by the pseudo fast forward/reverse operation and appropriately buffering the read out data. In a case of the pseudo fast forward operation, the updated P-th video data group read out at the step S44 is then decoded (expanded) and displayed as usual, whereas in a case of the pseudo fast reverse operation, the updated P-th video data group read out at the step S44 is then rearranged backwards in units of the video frames and then decoded (expanded) and displayed (step S45). Thus, in a case of the pseudo fast reverse operation, the buffered video data are displayed by being rearranged backwards in time, in a descending order of the sequential video frame numbers. Here, in order to simplify the decoding, the decoding (expanding) and displaying may be carried out by using a type of frame which is completely encoded within that frame itself.

After that, the presence or absence of the request for changing the playback mode is checked (step S46). If there is no further request for changing the playback mode (step S46 NO), the process returns to the step S42 to continue the same pseudo fast forward/reverse mode. On the other hand, if there is a further request for changing the playback mode (step S46 YES), the process proceeds to the operation of a new playback mode (step S47). Here, in a case of changing only a value or a sign of the speed multiplication factor t for the pseudo fast forward/reverse operation, the entire operation of FIG. 9 starting from the step S40 is carried out again to re-set the speed multiplication factor t.

Figure 10:
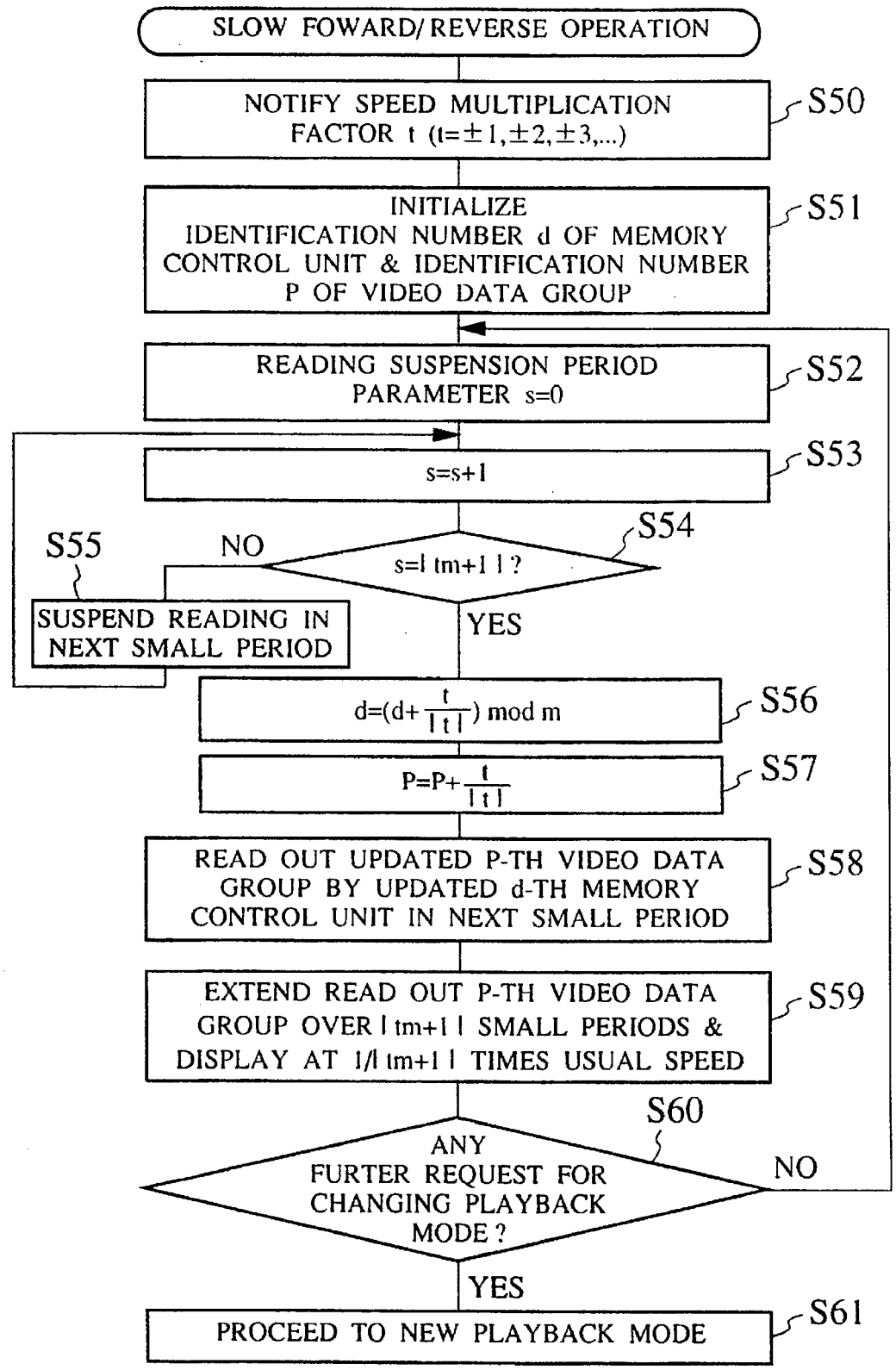
FIG. 10 is a flow chart for an operation in a slow forward/reverse mode according to one embodiment of the method of multiplexed data reading and visual search according to the present invention.

Next, an operation for the slow forward/reverse mode in this embodiment proceeds according to the flow chart of FIG. 10 as follows.

When the terminal requests the slow forward/reverse mode, a speed multiplication factor t for the slow forward/reverse operation is also notified to the center device (step S50). Here, the speed multiplication factor t can take any one of values such as ±1, ±2, ±3, etc., where a positive integer value indicates the slow forward operation, whereas a negative integer value indicates the slow reverse operation.

Then, the identification number d of the memory control unit and the identification number P of the video data group are initialized to the current values (step S51) first, and then updated to new values according to the playback mode changing. Here, a reading suspension period parameter s is initialized to 0 (step S52) first, and then increased by 1 at a time (step S53) and compared with an actual reading suspension period |tm+1|, that is an absolute value of a sum of 1 and a product of the speed multiplication factor t and the number m of the memory devices $M_0$ to $M_{m-1}$ (step S54), so as to judge whether or not to suspend the reading in the next small period. Namely, until the parameter s becomes equal to the actual reading suspension period |tm+1|, the reading is suspended in the next small period (step S55) by repeating the steps S53 and S54. When the parameter s becomes equal to the actual reading suspension period |tm+1|, the identification number d of the memory control unit to be accessed in the next small period is updated to [(d+t/|t|) mod m] (step S56), while the identification number P of the video data group to be read out next is updated to [P+t/|t|] (step S57). Then, the updated P-th video data group is read out by the updated d-th memory control unit in the next small period (step S58) and the read out data are appropriately buffered. Note here that the factor of t/|t| takes a value of +1 for the slow forward mode or a value of −1 for the slow reverse mode, which determines whether the identification number P of the video data group is to be increased or decreased.

In a case of the slow forward operation, the buffered video data group read out at the step S58 is decoded (expanded) and displayed by extending it over as many as |tm+1| of the small periods at the display speed of 1/|tm+1| times the usual speed, whereas in a case of the slow reverse operation, the buffered video data group read out at the step S58 is then rearranged backwards in units of the video frames and then decoded (expanded) and displayed by extending it over as many as |tm+1| of the small periods at the display speed of 1/|tm+1| times the usual speed (step S59).

After that, the presence or absence of the request for changing the playback mode is checked (step S60). If there is no further request for changing the playback mode (step S60 NO), the process returns to the step S52 to continue the same slow forward/reverse mode. On the other hand, if there is a further request for changing the playback mode (step S60 YES), the process proceeds to the operation of a new playback mode (step S61). Here, in a case of changing only a value or a sign of the speed multiplication factor t for the slow forward/reverse operation, the entire operation of FIG. 10 starting from the step S50 is carried out again to re-set the speed multiplication factor t.

Next, an operation for the backward skip search mode will be explained.

In the backward skip search mode, a video program is divided in units of video data for a prescribed period, and this divided unit of video data is set as a group data. Then, the skip reading for reading out only one group data in every prescribed number of groups is carried out in the reverse direction opposite to the normal playback direction, and the video data read out by this reading are buffered. Then, the buffered video data are decoded and displayed in an ascending order of the sequential video frame numbers at the usual speed in the usual playback direction. A series of these skip reading, buffering, and decoding and displaying operations are then repeated for each prescribed number of groups.

Figure 11:
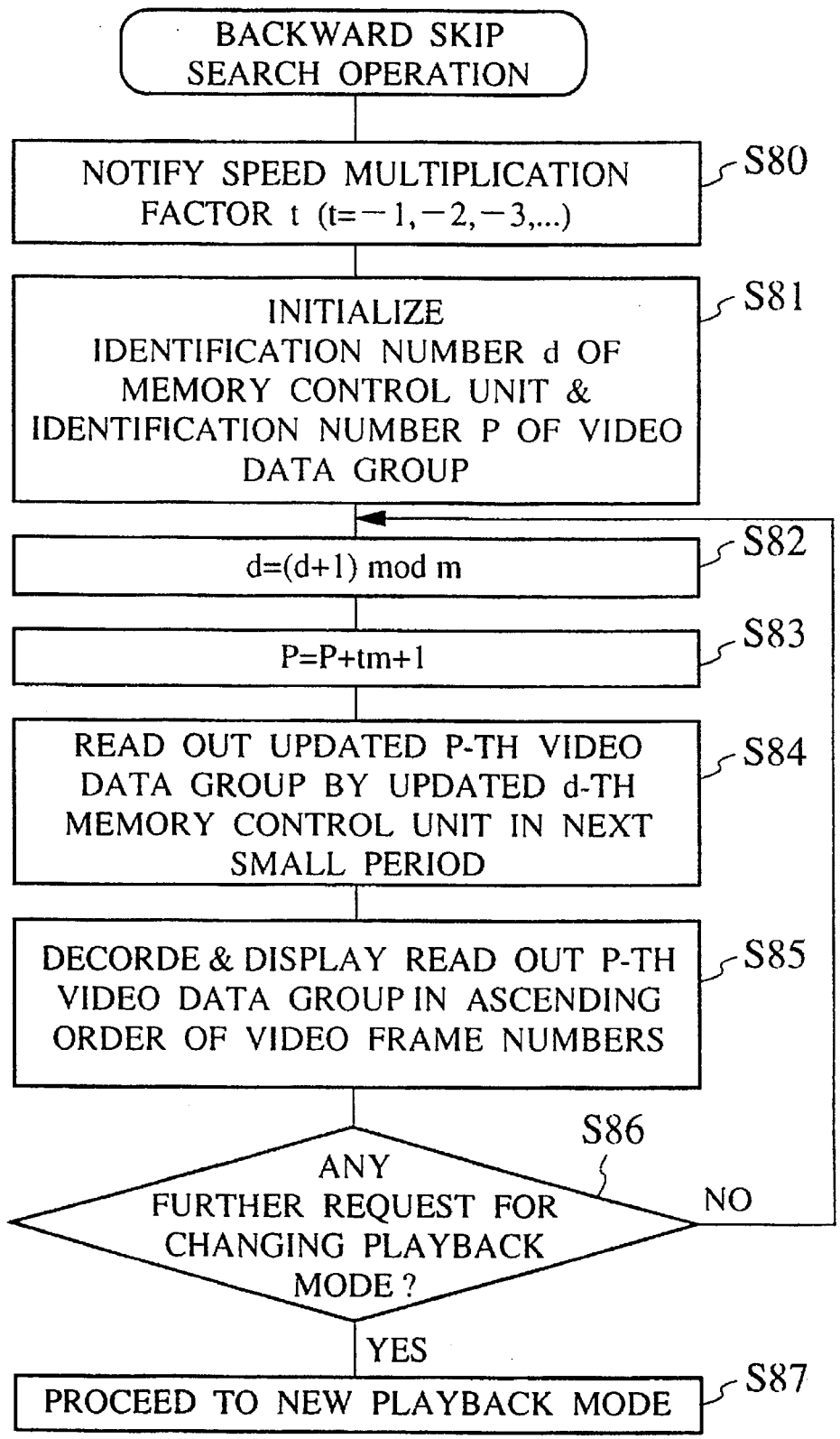
FIG. 11 is a flow chart for an operation in a backward skip search mode according to one embodiment of the method of multiplexed data reading and visual search according to the present invention.

More specifically, the operation for the backward skip search mode in this embodiment proceeds according to the flow chart of FIG. 11 as follows.

When the terminal requests the backward skip search mode, a speed multiplication factor t for the backward skip search operation is also notified to the center device (step S80). Here, the speed multiplication factor t can take any one of values such as −1, −2, −3, etc.

Then, the identification number d of the memory control unit and the identification number P of the video data group are initialized to the current values (step S81) first, and then updated to new values according to the playback mode changing. Namely, the identification number d of the memory control unit to be accessed in the next small period is updated to [(d+1) mod m] (step S82), while the identification number P of the video data group to be read out next is updated to [P+tm+1] (step S83).

Then, the updated P-th video data group is read out by the updated d-th memory control unit in the next small period (step S84) by skipping the data up to the updated P-th video data group required by the backward skip search operation and appropriately buffering the read out data.

Then, unlike the case of the pseudo fast reverse operation described above, the updated P-th video data group read out at the step S84 is then decoded (expanded) and displayed as it is as usual, without rearranging them backwards in time (step S85). Thus, in a case of the backward skip search operation, the read out data are buffered in an ascending order of the sequential video frame numbers and the buffered video data are displayed in an ascending order of the sequential video frame numbers.

After that, the presence or absence of the request for changing the playback mode is checked (step S86). If there is no further request for changing the playback mode (step S86 NO), the process returns to the step S82 to continue the same pseudo fast forward/reverse mode. On the other hand, if there is a further request for changing the playback mode (step S86 YES), the process proceeds to the operation of a new playback mode (step S87). Here, in a case of changing only a value or a sign of the speed multiplication factor t for the backward skip search operation, the entire operation of FIG. 11 starting from the step S80 is carried out again to re-set the speed multiplication factor t.

In other words, when the request for the backward skip search mode is received along with the speed multiplication factor t, the skip reading is done by skipping the video data groups specified by the received speed multiplication factor t in each small period, and then, after being buffered appropriately, the read out video data group is decoded and displayed in a manner of the normal playback mode only for a time of one small period alone. Then, these skip reading, buffering, and decoding and displaying operations are repeated for each prescribed number of groups in the backward direction.

Next, the operations in the above described pseudo fast forward/reverse mode and the backward skip search mode will be explained in further detail with reference to FIG. 12.

Figure 12:
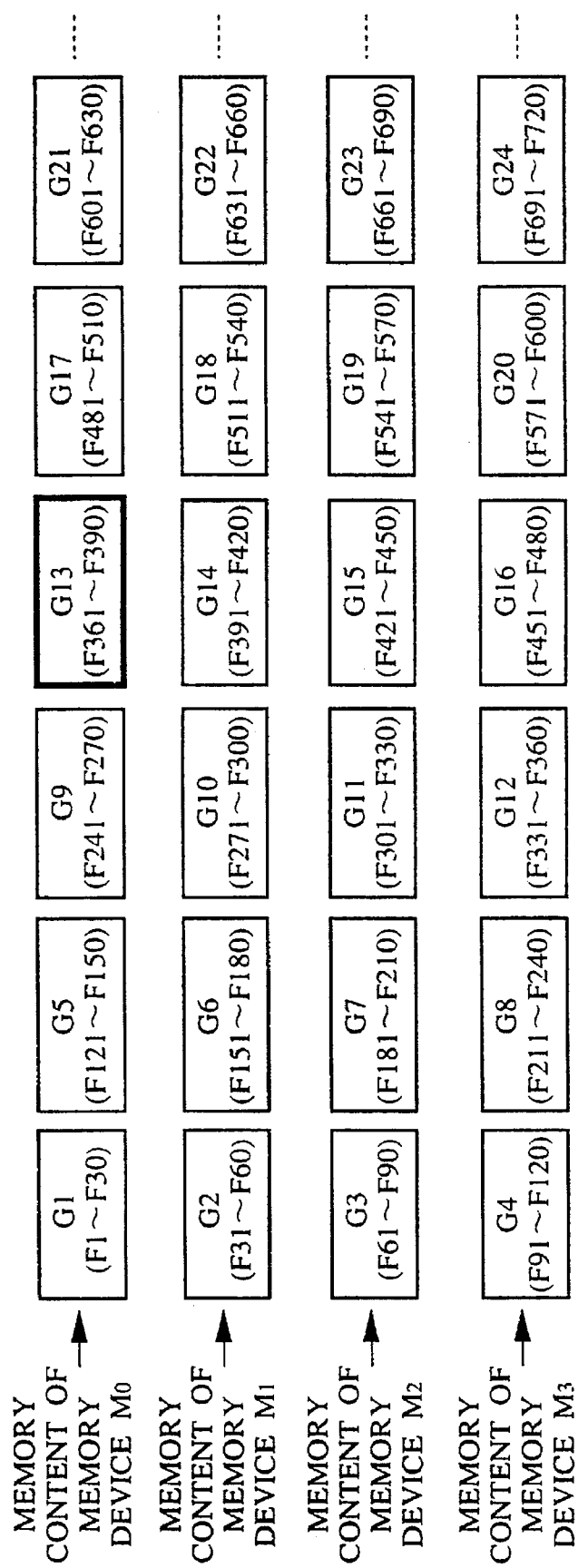
FIG. 12 is a diagram for explaining operations in a pseudo fast forward mode, a pseudo fast reverse mode, and a backward skip search mode in one embodiment of the method of multiplexed data reading and visual search according to the present invention.

FIG. 12 shows an exemplary case in which a number of the memory devices is set to be four (m=4) just as in a case of FIG. 3, and these four memory devices $M_0$ to $M_3$ are provided in parallel to each other. In addition, the video data are divided by taking data for 30 frames as one group, and the groups are distributed over the memory devices $M_0$ to $M_3$, such that the first frame F1 to the thirtieth frame F30 are set as the first group G1, the thirty first frame F31 to sixtieth frame F60 are set as the second group G2, and so on. The data are stored in units of these groups by shifting the memory devices cyclically one by one.

Now, when the request for changing the playback mode is issued while displaying the three hundred and seventieth frame F370, as this three hundred and seventieth frame F370 is belonging to the thirteenth group G13 stored in the memory device $M_0$, so that the identification number P of the video data group is initialized to be P=13, while the identification number d of the memory control unit is initialized to be d=0.

Then, in a case of the pseudo fast forward mode, the operation proceeds as follows.

In the current small period, the remaining data (frames F371 to F390) in the buffer are decoded and displayed in the same playback mode as it was immediately before the request for changing playback mode was issued. Here, instead of this, the remaining data may be decoded and displaying in the normal playback mode in the forward direction as F371, F372, F373, and so on, or the pause display may be made, if desired. Then, in the subsequent small periods, the reading and the decoding and displaying of the data are carried out as follows.

In a case of using the speed multiplication factor t=+1 (corresponding to the fast forward playback at about five times faster speed) for example, the identification number d of the memory control unit to be accessed in the next small period and the identification number P of the video data group to be read out in the next small period are obtained by the following calculations.

$$d=(d+1) \bmod m=(0+1) \bmod 4=1$$

$$P=P+tm+1=13+1\cdot4+1=18$$

Therefore, in the next small period, the video data in the group number P=18 (i.e., the eighteenth group G18) are read out from the memory device $M_1$ by the (d=1)-th (i.e., first) memory control unit $MC_1$ (hence, it corresponds to the fast forward playback at about five times faster speed) and buffered, and then the buffered data are decoded and displayed in the sequential order of F511, F512, F513, and so on. Thereafter, the similar reading, buffering, and decoding and displaying in the forward direction of the video data group are repeated.

In other words, in the pseudo fast forward mode, a video program is divided in units of video data for a prescribed period, and this divided unit of video data is set as a group data. Then, the skip reading for reading out only one group data in every prescribed number of groups is carried out in the normal playback direction, and the video data read out by this reading are buffered. Then, the buffered video data are decoded and displayed in an ascending order of the sequential video frame numbers at the usual speed in the usual playback direction. A series of these skip reading, buffering, and decoding and displaying operations are then repeated for each prescribed number of groups.

By means of this pseudo fast forward operation, the operation equivalent to the usual fast forward operation can be realized with more natural displayed images than the usual fast forward operation. Namely, when one group data are displayed in one second for example, the display during that one second is made at the normal speed, so that the image for one group data is displayed at the natural speed during the overall fast forward operation. In addition, the speech during that period to time can also be maintained at the natural speed and pitch, so that the search of the desired image can be made easier by this pseudo fast forward operation.

Next, in a case of the pseudo fast reverse mode, the operation proceeds as follows.

In the current small period, the remaining data (frames F371 to F390) in the buffer are decoded and displayed in the same playback mode as it was immediately before the request for changing playback mode was issued. Here, instead of this, the earlier data may be decoded and displaying in the reverse direction as F369, F368, F367, and so on, or the pause display may be made, if desired. Then, in the subsequent small periods, the reading and the decoding and displaying of the data are carried out as follows.

In a case of using the speed multiplication factor t=−1 (corresponding to the fast reverse playback at about three times faster speed) for example, the identification number d of the memory control unit to be accessed in the next small period and the Identification number P of the video data group to be read out in the next small period are obtained by the following calculations.

$$d=(d+1) \bmod m=(0+1) \bmod 4=1$$

$$P=P+tm+1=13-1\cdot4+1=10$$

Therefore, in the next small period, the video data in the group number P=10 (i.e., the tenth group G10) are read out from the memory device $M_1$ by the (d=1)-th (i.e., first) memory control unit $MC_1$ (hence, it corresponds to the fast reverse playback at about three times faster speed) and buffered, and then the buffered data are rearranged backwards as F300, F299, F298, and so on, and then decoded and displayed in that backwardly rearranged order in the reverse direction. Thereafter, the similar reading, buffering, and decoding and displaying in the reverse direction of the video data group are repeated.

In other words, in the pseudo fast reverse mode, a video program is divided in units of video data for a prescribed period, and this divided unit of video data Is set as a group data. Then, the skip reading for reading out only one group data in every prescribed number of groups is carried out in the reverse direction opposite to the normal playback direction and the video data read out by this reading are buffered. Then, the buffered video data are decoded and displayed in a descending order of the sequential video frame numbers at the usual speed in the reverse direction. A series of these skip reading, buffering, and decoding and displaying operations are then repeated for each prescribed number of groups.

By means of this pseudo fast reverse operation, the operation equivalent to the usual fast reverse operation can be realized with more natural displayed images than the usual fast reverse operation. Namely, when one group data are displayed in one second for example, the display during that one second is made at the normal speed, so that the image for one group data is displayed at the natural speed during the overall fast reverse operation, and therefore the search of the desired Image can be made easier by this pseudo fast reverse operation.

Next, in a case of the backward skip search mode, the operation proceeds as follows.

In the current small period, the remaining data (frames F371 to F390) in the buffer are decoded and displayed in the same playback mode as it was immediately before the request for changing playback mode was issued. Here, instead of this, the remaining data may be decoded and displaying in the normal playback mode in the forward direction as F371, F372, F373, and so on, or the pause display may be made, if desired. Then, in the subsequent small periods, the reading and the decoding and displaying of the data are carried out as follows.

In a case of using the speed multiplication factor $t=-1$ (corresponding to the backward skip search at about three times faster speed) for example, the identification number d of the memory control unit to be accessed in the next small period and the identification number P of the video data group to be read out in the next small period are obtained by the following calculations.

$d=(d+1) \bmod m=(0+1) \bmod 4=1$ $P=P+tm+1=13-1\cdot4+1=10$

Therefore, in the next small period, the video data in the group number P=10 (i.e., the tenth group G10) are read out from the memory device $M_1$ by the (d=1)-th (i.e., first) memory control unit $MC_1$ (hence, it corresponds to the backward skip search at about three times faster speed) and buffered, and then the buffered data are decoded and displayed in the sequential order of F271, F272, F273, and so on, in the forward direction. Thereafter, the similar reading, buffering, and decoding and displaying in the forward direction of the video data group are repeated.

By means of this backward skip search operation, the operation equivalent to the usual fast reverse operation can be realized with more natural displayed images than the usual fast reverse operation. Namely, when one group data are displayed in one second for example, the display during that one second is made at the normal speed, so that the image for one group data is displayed at the natural speed during the overall fast reverse operation. In addition, even through the overall operation is the fast reverse, the display during that one second is made in the normal playback direction, so that the Image displayed during that one second is the same as that in the normal playback mode, and the speech during that period to time can also be maintained at the natural speed and pitch, so that the search of the desired image can be made easier by this pseudo fast forward operation.

As described, according to this embodiment, it is possible to provide a method of multiplexed data reading and visual search capable of admitting more than n requests simultaneously in a configuration in which m sets of n-fold multiplexed sub-systems are provided in parallel, while enabling the visual search operations such as the playback mode changing among the normal playback mode, the pseudo fast forward/reverse mode, the slow forward/reverse mode, the jump mode, and the backward skip search mode, and the playback mode changing from the still forward/reverse display and the pause display to the aforementioned playback modes.

It is to be noted here that the above described pseudo fast forward/reverse operation and backward skip search operation by themselves are essentially unrelated with the multiplexed reading of the data, so that any one of these pseudo fast forward/reverse operation and backward skip search operation may be carried out without making the multiplexed reading of the data, if desired.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of multiplexed data reading and visual search with respect to a plurality of memory devices through m memory control means connected to the memory devices and m×n input/output channels selectively connected to said m memory control devices via switching means, where m and n are integers greater than one, the method comprising the steps of:

(a) dividing each video program into a plurality of video data groups and storing the video data groups of each video program in a prescribed order among the memory devices;

(b) connecting said m memory control means with said m×n input/output channels selectively and sequentially by the switching means in units of time-slots such that each of said m memory control means is connected with each of said m×n input/output channels at least once within a prescribed large period, said prescribed large period being defined by a plurality of time-slots divided into m small periods;

(c) carrying out the reading operations of the video data groups stored by the step (a) in the memory devices by making accesses from said m memory control means in parallel at each time-slot such that each video data group read by each of said m memory control means from one of the memory devices connected thereto at each time-slot is transmitted to one of said m×n input/output channels connected by the step (b) thereto at each time-slot; and (d) carrying out the visual search operations with respect to the video data groups stored by the step (a) in the memory devices by abandoning a time-slot allocated to one input/output channel in a next small period when a request for changing a current playback mode to a new playback mode is received from a terminal connected with said one input/output channel in a current small period, allocating a new time-slot at which a next video data group to be accessed in the next small period according to the new playback mode is accessible to said one input/output channel in the next small period, and reading and buffering the next video data group by using the new time-slot in the next small period.

2. The method of claim 1, wherein at the step (d), the next video data group to be accessed in the next small period according to the new playback mode is a video data group containing a video data specified by the request as a playback mode changing target.

3. The method of claim 2, wherein at the step (d), in a case a time-slot accessible to said video data group containing a video data specified by the request as a playback mode changing target is not available in the next small period, the next video data group to be accessed in the next small period according to the new playback mode is changed to a video data group which is closest to said video data group containing a video data specified by the request as a playback mode changing target among all video data groups which are accessible from time-slots available in the next small period.

4. The method of claim 1, wherein the new playback mode requested by the request is any one of a pseudo fast forward/reverse mode, a slow forward/reverse mode, and a backward skip search mode.

5. The method of claim 4, wherein the new playback mode requested by the request is the pseudo fast forward mode for executing a pseudo fast forward operation in which, in response to a speed multiplication factor received along with the request, a reading and buffering of one video data group by skipping a number of video data groups specified by the speed multiplication factor in a forward direction and a decoding and displaying of the buffered video data group in a normal playback mode in one small period are repeated.

6. The method of claim 4, wherein the new playback mode requested by the request is the pseudo fast reverse mode for executing a pseudo fast reverse operation in which, in response to a speed multiplication factor received along with the request, a reading and buffering of one video data group by skipping a number of video data groups specified by the speed multiplication factor in a reverse direction, a rearranging of video data in the buffered video data group backwards in time, and a decoding and displaying of the rearranged video data of the buffered video data group in a reverse direction at a normal speed in one small period are repeated.

7. The method of claim 4, wherein the new playback mode requested by the request is a slow forward mode for executing a slow forward operation in which, in response to a speed multiplication factor received along with the request, a reading and buffering of one video data group in as many large periods as specified by the speed multiplication factor in a forward direction, an extending of the buffered video data group over a period of time specified by the speed multiplication factor, and a decoding and displaying of the extended video data group are repeated.

8. The method of claim 4, wherein the new playback mode requested by the request is a slow reverse mode for executing a slow reverse operation in which, in response to a speed multiplication factor received along with the request, a reading and buffering of one video data group in as many large periods as specified by the speed multiplication factor in a forward direction, a rearranging of video data in the buffered video data group backwards in time, an extending of the rearranged video data of the buffered video data group over a period of time specified by the speed multiplication factor, and a decoding and displaying of the extended video data group are repeated.

9. The method of claim 4, wherein the new playback mode requested by the request is the backward skip search mode for executing a backward skip search operation in which, in response to a speed multiplication factor received along with the request, a reading and buffering of one video data group by skipping a number of video data groups specified by the speed multiplication factor in a reverse direction and a decoding and displaying of the buffered video data group in a normal playback mode in one small period are repeated.

10. The method of claim 1, wherein at the step (a), the prescribed order to store the video data groups in the memory devices is a cyclic order among the memory devices.

11. The method of claim 1, wherein at the step (b), the prescribed large period is defined by $m \times n \times h$ time-slots divided into m small periods, each small period being defined by $n \times h$ time-slots, where h is a natural number, and said m memory control means are connected with said $m \times n$ input/output channels selectively and sequentially such that an l-th memory control unit is connected with $[(j+l \bmod m) \cdot n + i)]$-th input/output channels for h times in a j-th small period, where l is an integer for which $0 \leq l \leq m-1$, j is an integer for which $0 \leq j \leq m-1$, and i is an integer for which $1 \leq i \leq n$.

12. The method of claim 1, wherein at the step (c), the reading operations through said m memory control means and said $m \times n$ input/output channels are synchronized at each time-slot.

13. The method of claim 1, wherein at the step (c), the reading operations through said m memory control means and said $m \times n$ input/output channels are synchronized at each n time-slots.

14. The method of claim 1, wherein at the step (c), the reading operations through said m memory control means and said $m \times n$ input/output channels are synchronized at each small period defined by $n \times h$ time-slots, where h is a natural number.

15. The method of claim 1, wherein at the step (c), the reading operations through said m memory control means and said $m \times n$ input/output channels are synchronized at each large period defined by $m \times n \times h$ time-slots, where h is a natural number.

16. The method of claim 1, wherein said $m \times n$ input/output channels are connected with a plurality of terminals via a network, and at the step (b), the switching means are controlled to connect said m memory control means with said $m \times n$ input/output channels selectively and sequentially in accordance with requests for reading of each video program issued by the terminals.

* * * * *